(12) United States Patent
Chiang (10) Patent No.: US 10,825,372 B2
(45) Date of Patent: Nov. 3, 2020

(54) DISPLAY DEVICE

(71) Applicant: InnoLux Corporation, Miao-Li County (TW)

(72) Inventor: Chien-Hsueh Chiang, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 82 days.

(21) Appl. No.: 16/160,203

(22) Filed: Oct. 15, 2018

(65) Prior Publication Data
US 2019/0147784 A1    May 16, 2019

(30) Foreign Application Priority Data

Nov. 15, 2017  (CN) .......................... 2017 1 1129125

(51) Int. Cl.
*G09G 3/20*  (2006.01)
*G06F 3/041*  (2006.01)

(52) U.S. Cl.
CPC ............. *G09G 3/20* (2013.01); *G06F 3/0412* (2013.01); *G09G 2300/0426* (2013.01); *G09G 2310/08* (2013.01)

(58) Field of Classification Search
CPC ........... G09G 3/20; G09G 2300/04264; G09G 2310/08; G06F 3/0412
USPC ......................................................... 345/173
See application file for complete search history.

(56) References Cited

U.S. PATENT DOCUMENTS

| | | | | |
|---|---|---|---|---|
| 2006/0050563 | A1* | 3/2006 | Lee ...................... | G09G 3/3648 365/185.22 |
| 2009/0303166 | A1* | 12/2009 | Tsubata .................. | G09G 3/342 345/87 |
| 2014/0320446 | A1* | 10/2014 | Kim ........................ | G06F 3/044 345/174 |
| 2015/0348457 | A1* | 12/2015 | Ito ......................... | G09G 3/3677 345/690 |
| 2017/0270889 | A1* | 9/2017 | Kang ................... | G09G 3/3677 |

* cited by examiner

*Primary Examiner* — Mark Edwards
(74) *Attorney, Agent, or Firm* — Muncy, Geissler, Olds & Lowe, P.C.

(57) ABSTRACT

A display device includes a panel. The panel includes a display array and a first scan line group. The display array displays a first image and a second image following the first image, and has a first regulation array. The first scan line group is arranged corresponding to the first regulation array. There is a blanking period existed between a first update period corresponding to the first image and a second update period corresponding to the second image. The blanking period has a first sub-period. The first scan line group sends a first scan signal to the first regulation array in the first sub-period.

19 Claims, 8 Drawing Sheets

(for the second image or the first image)

DISPLAY DEVICE

CROSS REFERENCE TO RELATED APPLICATION

This application claims the benefits of the China Patent Application Serial Number 201711129125.4, filed on Nov. 15, 2017, the subject matter of which is incorporated herein by reference.

BACKGROUND

1. Field of the Invention

The present disclosure relates to a display device and, more particularly, to a display device capable of pre-charging.

2. Description of Related Art

Nowadays, in pursuit of a higher image resolution or a larger screen-to-body ratio, a display device is typically required to have a shorter pixel scanning time. Accordingly, the pixel provided with pre-charging capability has become a critical issue. In view of this, it is desirable to make a research on a driving mechanism that effectively improves the pixel pre-charging capability.

SUMMARY

The present disclosure provides a display device comprising a panel. The panel comprises a display array for displaying a first image and a second image following the first image, the display array having a first regulation array; and a first scan line group arranged corresponding to the first regulation array, wherein a blanking period exists between a first update period corresponding to the first image and a second update period corresponding to the second image, the blanking period has a first sub-period, and the first scan line group sends a first scan signal to the first regulation array in the first sub-period.

DETAILED DESCRIPTION

In the following description, various embodiments will be provided to explain the implementation and operation of the display device of the present disclosure. The person skilled in the art of the present disclosure will understand the features and advantages of the present disclosure through these embodiments. Various combination, modification, substitution or adaptation may be realized based on the present disclosure.

Hereinafter, the term "connection" may refer to direct connection or indirect connection, comprising but not limited to electrical connection. The conditions "A, when B" and "A, if B" may refer to "A, when, before or after B", but is not limited to the events that A and B happen simultaneously. The aforementioned definitions are only exemplary but not meant to be limiting.

Figure 1:
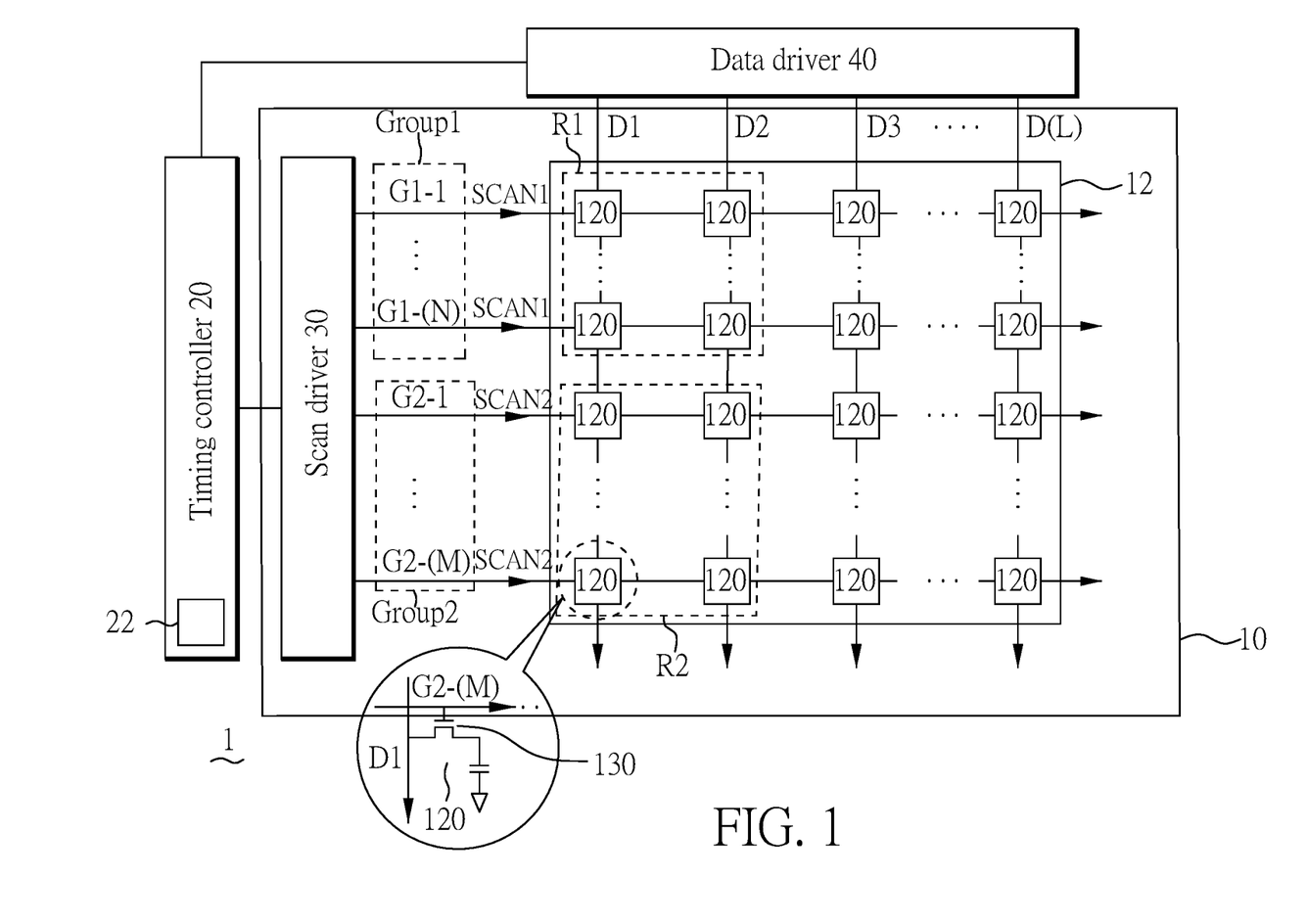
FIG. 1 is a schematic diagram illustrating the structure of the display device according to one embodiment of the present disclosure.

FIG. 1 is a schematic diagram illustrating the structure of the display device 1 according to one embodiment of the present disclosure. As shown in FIG. 1, the display device 1 comprises a panel 10. The panel 10 comprises a display array 12, a first scan line group Group1, a second scan line group Group2 and a plurality of data lines D1-D(L), where L is a positive integer. The display array 12 displays a first image and a second image following the first image (that is, the second image is displayed after the first image), and the display array 12 has a first regulation array R1 and a second regulation array R2, wherein the first image corresponds to a first update period, and the second image corresponds to a second update period. Each of the first regulation array R1 and the second regulation array R2 has a plurality of pixels 120 (the pixels in the first regulation array R1 may be defined as first pixels, and the pixels in the second regulation array R2 may be defined as second pixels), wherein each pixel 120 comprises a switch component 130 for controlling the pixel 120. In one embodiment, the switch component 130 of the pixel 120 has a gate end (gate), a source end (source) and a drain end (drain). In one embodiment, the switch component 130 of the pixel 120 is electrically connected with a scan line by its gate end. For example, the second scan line G2-(M) is electrically connected with all the gate ends of the switch components 130 of pixels 120 in the 2-(M)-th row, but it is not limited thereto. In one embodiment, the switch component 130 of the pixel 120 is electrically connected with a data line at its source end or its drain end. For example, the data line D1 is electrically connected with all the source ends or the drain ends of the switch components 130 of the pixels 120 in the first column, and the other ends of the switch components 130 are electrically connected with the pixel electrodes (not shown) of the pixel 120, respectively, but it is not limited thereto. In other embodiments, the gates of the switch components 130 of some pixels 120 in the same row are electrically connected with different scan lines. Alternatively, the source ends or the drain ends of the switch components 130 of some pixels 120 in the same column are electrically connected with different data lines, but it is not limited thereto in the present disclosure. The first regulation array R1 does not overlap the second regulation array R2. The first regulation array R1 and the second regulation array R2 may have different numbers of the pixels. The first scan line group Group1 has a plurality of first scan lines G1-1 to G1-(N), where N is a positive integer, for example, more than 20, but it is not limited thereto. The second scan line group Group2 has a plurality of second scan lines G2-1 to G2-(M), where M is a positive integer, for example, more than 20, but it is not limited thereto. The first scan line group Group1 does not overlap the second scan line group Group2. The first scan line group Group1 is arranged corresponding to the first regulation array R1, and sequentially sends the first scan signal SCAN1 to the first regulation array R1, but it is not limited thereto. The second scan line group Group2 is arranged corresponding to the second regulation array R2, and sequentially sends a second scan signal SCAN2 to the second regulation array R2, but it is not limited thereto. Some of the data lines D1-D(L) (for example, D1 and D2) may be arranged corresponding to the first regulation array R1, to send the gray level voltage required for displaying the first image or the second image in the first update period or the second update period to the first regulation array R1. In addition, between the first update period and the second update period, there is a blanking period. The blanking period further has a first sub-period T1 and a second sub-period T2 (shown in FIGS. 4(A)-4(D)). Some of the data lines D1-D(L) (for example, D1 and D2) may send the regulation voltage required by the first regulation array R1 in the first sub-period T1 of the blanking period to the first regulation array R1, wherein the gray level voltages or the regulation voltage may be provided by the data driver 40. Herein, the gray level voltages are required by the pixels for displaying the first image or the second image, but it is not limited thereto. Some of the data lines D1-D(L) (for example, D1 and D2) may be arranged corresponding to the second regulation array R2, so as to send the gray level voltages for displaying the first image or the second image in the first update period or the second update period to the second regulation array R2. Alternatively, some of the data lines D1-D(L) (for example, D1 and D2) may send the regulation voltage required by the second regulation array R2 in the second sub-period T2 of the blanking period to the second regulation array R2, wherein the gray level voltages or the regulation voltage may be provided by the data driver 40, but it is not limited thereto. In one embodiment, the first scan line group Group1 synchronously or asynchronously sends a first scan signal SCAN1 to first regulation array R1 in the first sub-period T1. In this way, in the first sub-period T1, the switch components 130 of the pixels 120 in the first regulation array R1 will be turned on by the first scan signal SCAN1, and receive the regulation voltage required for displaying the first image or the second image from the corresponding data lines (for example, D1 and D2). Thus, the pixels 120 in the first regulation array R1 will be pre-charged in the first sub-period T1 of the blanking period. Herein, "pre-charging" means to pre-charge the pixels 120 to the required regulation voltage in the first sub-period T1 or the second sub-period T2 of the blanking period, but it is not limited thereto. The following description will discuss in detail about the arrangements of the first scan line group Group1 and the second scan line group Group2 respectively corresponding to the first regulation array R1 and the second regulation array R2, the definitions of the first image period and the second image period, and the detailed operation in the blanking period.

Furthermore, the type of the pixel 120 may be liquid crystal display (LCD) component or light emitting diode (LED). For example, the aforementioned light emitting diode may be an organic light emitting diode (OLED), a mini light emitting diode (mini-LED), a micro light emitting diode (micro LED), a quantum dot light emitting diode (Q-LED), a flexible active matrix organic light emitting diode (AMOLED), and so on, and it is not limited thereto in the present disclosure. The switch component 130 in the pixel 120 may be an amorphous thin-film transistor, a low temperature polysilicon thin-film transistor, a metal-oxide thin-film transistor or a combination thereto, but it is not limited thereto.

Furthermore, in one embodiment, in the second sub-period T2 of the blanking period, the second scan line group Group2 synchronously or asynchronously sends a second scan signal SCAN2 to the second regulation array R2. In this way, in the second sub-period T2, the pixels 120 in the second regulation array R2 will be turned on by the second scan signal SCAN2, and receive the regulation voltage required for displaying the first image or second image from the corresponding data lines (for example, D1 and D2). Thus, the pixels 120 in the second regulation array R2 will be pre-charged in the second sub-period T2 of the blanking period, wherein the first sub-period T1 of the blanking period does not overlap the second sub-period T2 thereof. In another embodiment, the first sub-period T1 of the blanking period at least partially overlaps the second sub-period T2, but it is not limited thereto. However, the blanking period may have a plurality of sub-periods rather than only the first sub-period T1 and the second sub-period T2. The number of sub-periods may be increased or decreased depending on the number A*B of the regulation arrays in the display array 12 and may be further modified depending on the design requirement, where A and B are each a positive integer greater than or equal to. For example, a display array 12 has the number A of regulation arrays in the horizontal direction (along the direction of the scan line), and has the number B of regulation arrays in the vertical direction (along the direction of the data line), so that the blanking period is divided into the number A of sub-periods, denoted as T1 to T(A), to pre-charge the pixels in the number A*B of regulation arrays, but it is not limited thereto in the present disclosure. In one embodiment, the first regulation array R1 and the second regulation array R2 are pre-charged to different regulation voltages with the same polarity but different magnitudes. In another embodiment, the first regulation array R1 and the second regulation array R2 are pre-charged to the regulation voltage with different polarities and different magnitudes, but it is not limited thereto.

It should be noted that, the display array 12 of the present disclosure is not limited to having only the first regulation array R1 and the second regulation array R2. In another embodiment, the display array 12 has only the first regulation array R1 or only the second regulation array R2. In another embodiment, the display array 12 has more regulation arrays R1 to R(N), where N is a positive integer and N is smaller than the resolution of the display array 12. The sizes of the regulation arrays may be different, and may be modified depending on the design requirement.

In one embodiment, a measurement on the voltages in the first regulation array R1 or the second regulation array R2 of the display array 12 is performed in the blanking period, in order to check whether the display device 1 is capable of performing pre-charge in the blanking period, but it is not limited thereto.

The following description will discuss in detail about the features of the components of the display device 1.

In one embodiment, the display device 1 is further provided with a timing controller 20, a scan driver 30 and a data driver 40. The timing controller 20 is electrically connected with the scan driver 30 and the data driver 40. The timing controller 20, the scan driver 30 and the data driver 40 may be arranged in different ways. For example, in one embodiment, the timing controller 20, the scan driver 30 and the data driver 40 are all arranged in the non-display region within the panel 10 (that is, the region out of the display array 12). In another embodiment, the timing controller 20 is arranged out of the panel 10, and the scan driver 30 and the data driver 40 are arranged in the non-display region within the panel 10. In still another embodiment, the timing controller 20, the scan driver 30 and the data driver 40 are all arranged out of the panel 10. In yet another embodiment, at least one of the timing controller 20, the scan driver 30 and the data driver 40 is arranged on the back surface of the substrate, and electrically connected with the switch components 130 of the pixels arranged on the front surface of the substrate by the through substrate vias, wherein the through substrate vias are arranged out of the panel 10, or in the non-display region or on the display array 12 of the panel 10, and it is not limited thereto in the present disclosure. Furthermore, the scan driver 30 is electrically connected with the scan lines (for example, all the scan lines), and the data driver 40 is electrically connected with the data lines D1-D(L).

Figure 2:
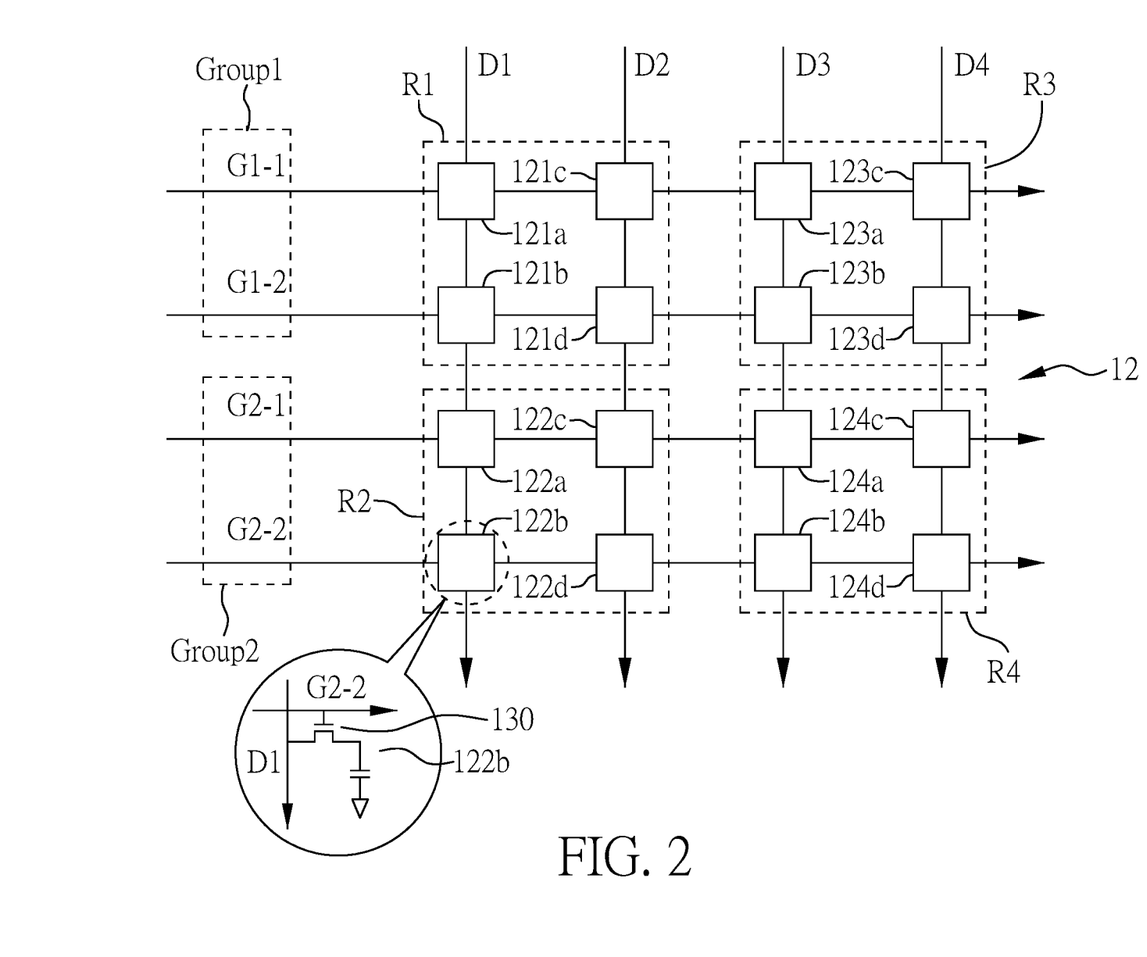
FIG. 2 is a schematic diagram illustrating the structure of the display array according to one embodiment of the present disclosure.

FIG. 2 is a schematic diagram illustrating the structure of the display array 12 according to one embodiment of the present disclosure. With reference to both FIG. 1 and FIG. 2, for the sake of clear explanation, the display array 12 in the embodiment of FIG. 2 is simplified to have only two first scan lines (G1-1 and G1-2), two second scan lines (G2-1 and G2-2), and four data lines D1-D4. However, in practical applications, the display array 12 of the present disclosure may have more scan lines, or more or less data lines. In addition, FIG. 2 only shows sixteen pixels. However, in practical applications, the display array 12 of the present disclosure may have more pixels.

As shown in FIG. 2, the display array 12 has a first regulation array R1, a second regulation array R2, a third regulation array R3 and a fourth regulation array R4; that is, the display array 12 is divided into four regions, but it is not limited thereto (and in practical applications, more or less regulation arrays may be provided according to the present disclosure). Furthermore, the first regulation array R1 has four pixels 121a to 121d, and the second regulation array R2 has four pixels 122a to 122d, the third regulation array R3 has four pixels 123a to 123d, and the fourth regulation array R4 has four pixels 124a to 124d, but it is not limited thereto (and in practical applications, the regulation arrays of the present disclosure may have unrestricted and different numbers of pixels).

Furthermore, in this embodiment, the panel 10 has a first scan line group Group1 and a second scan line group Group2. The first scan line group Group1 has first scan lines G1-1 and G1-2, and the second scan line group Group2 has second scan lines G2-1 and G2-2. The period during which the first scan line group Group1 sends the first scan signal SCAN1 in first sub-period T1 does not overlap the period during which the second scan line group Group2 sends the second scan signal SCAN2 in the second sub-period T2. In another embodiment, the first sub-period T1 at least partially overlaps the second sub-period T2. The number of the aforementioned scan line groups is exemplary, and in practical applications, more scan line groups may be provided according to the present disclosure, and each scan line group may have an unrestricted number of scan lines.

The following description will discuss in detail about the arrangement of the first scan line group Group1 and the second scan line group Group2 corresponding to the regulation arrays R1 to R4. In this embodiment, "the first scan line group Group1 arranged corresponding to the first regulation array R1" means that the first scan line G1-1 is electrically connected with the gate ends of the switch components 130 of the pixels (121a and 121c) in the first regulation array R1, and the first scan line G1-2 is electrically connected with the gate ends of the switch components 130 of the pixels (121b and 121d) in the first regulation array R1. Such arrangement relation is only exemplary, and it is not limited thereto in the present disclosure.

Furthermore, the first scan line group Group1 may be arranged corresponding to the third regulation array R3; that is, the first scan line G1-1 is electrically connected with the gate ends of the switch components 130 of the pixels (pixels 123a and 123c) of the third regulation array R3, and the first scan line G1-2 is electrically connected with the gate ends of the switch components 130 of the pixels (pixels 123b and 123d) of the third regulation array R3. Such arrangement relation is only exemplary, and it is not limited thereto in the present disclosure.

In this embodiment, "the second scan line group Group2 arranged corresponding to the second regulation array R2" means that the second scan line G2-1 is electrically connected with the gate ends of the switch components 130 of the pixels (pixels 122a and 122c) in the second regulation array R2, and the second scan line G2-2 is electrically connected with the gate ends of the switch components 130 of the pixels (pixels 122b and 122d) in the second regulation array R2. Such arrangement relation is only exemplary, and it is not limited thereto in the present disclosure.

Furthermore, the second scan line group Group2 may be arranged corresponding to the fourth regulation array R4; that is, the second scan line G2-1 is electrically connected with the gate ends of the switch components 130 of the pixels (pixels 124a and 124c) of the fourth regulation array R4, and the second scan line G2-2 is electrically connected with the gate ends of the switch components 130 of the pixels (pixels 124b and 124d) of the fourth regulation array R4. Such arrangement relation is only exemplary, and it is not limited thereto in the present disclosure.

In this embodiment, the data line D1 is electrically connected with the source ends or the drain ends of the switch components 130 of the pixels 121a, 121b, 122a and 122b. The data line D2 is electrically connected with the source ends or the drain ends of the switch components 130 of the pixels 121c, 121d, 122c and 122d. The data line D3 is electrically connected with the source ends or the drain ends of the switch components 130 of the pixels 123a, 123b, 124a and 124b. The data line D4 is electrically connected with the source ends or the drain ends of the switch components 130 of the pixels 123c, 123d, 124c and 124d, but it is not limited thereto.

The following description will discuss the operations of the timing controller 20, the scan driver 30 and data driver 40 with a simplified structure of FIG. 2, referring to both FIGS. 1 and 2.

In one embodiment, the timing controller 20 controls the timing of the scan driver 30 and the data driver 40. The scan driver 30 sends, based on the timing, the scan signals to the first scan line G1-1, the first scan line G1-2, the second scan line G2-1 and the second scan line G2-2 corresponding thereto, in order to turn on the pixels electrically connected with the scan line (for example, the pixels 121a, 121c, 123a and 123c electrically connected with the first scan line G1-1), and so on. The data driver 40 sends, based on the timing, the corresponding data signals to the corresponding data lines D1-D4, thereby allowing the turned-on pixels (for example, the pixels 121a, 121c, 123a and 123c electrically connected with the first scan line G1-1) to receive the required regulation voltage, and so on. In other embodiments, the aforementioned operations may also be modified depending on practical applications. For example, in the first sub-period T1 or the second sub-period T2, at least one pixel receives the scan signals and the data signals for two or more times (and thus is charged for many times), but it is not limited thereto in the present disclosure. In other words, any mechanism that can improve the pre-charging capability in the blanking period and thus improve the charging speed of at least one pixel or the quality for displaying the first image or the second image belongs to the scope of the present disclosure.

In one embodiment, when the corresponding switch components 130 are turned on, the pixels 121a to 121d, the pixels 122a to 122d, the pixels 123a to 123d and the pixels 124a to 124d are pre-charged by the data signals in the first sub-period T1 or the second sub-period T2 of the blanking period until they reach their respective regulation voltages required by the first regulation array R1, the second regulation array R2, the third regulation array R3 and the fourth regulation array R4, respectively. Furthermore, in the present disclosure, the update period is defined to be the period that all the pixels of the panel are charged to their respective required gray level voltages by the data lines after being turned on/off by the scan lines. That is, the first update period is defined to be the period that all the pixels reach the required gray level voltages for displaying the first image. The second update period is defined to be the period that all the pixels reach the required gray level voltages for displaying the second image. The blanking period is between two update periods, for example, between the first update period and the second update period.

In this case, for a single pixel (for example, the pixel 121a), when the gray level voltage required for displaying the first image is significantly different from or even opposite to the gray level voltage required for displaying second image, it will spend more time to charge the pixel (for example, the pixel 121a) for displaying the second image. In order to overcome this problem, the timing controller 20 of the present disclosure controls the timing of the scan driver 30 and the data driver 40, allowing the scan driver 30 to sequentially send the scan signal to the first regulation array R1 or the second regulation array R2 through the first scan line group Group1 or the second scan line group Group2 in the first sub-period T1 or the second sub-period T2 of the blanking period, or to sequentially send the scan signal to the third regulation array R3 or the fourth regulation array R4 through a first scan line group Group1 or a second scan line group Group2, and also allowing the data driver 40 to send, in the corresponding timing, partial image data of the second image (or the first image) to the first regulation array R1, second regulation array R2, the third regulation array R3 and the fourth regulation array R4, in order to pre-charge the regulation arrays R1 to R4 in the blanking period. In one embodiment, the regulation arrays R1 to R4 are pre-charged in different timings, depending on their corresponding scan line groups. In one embodiment, the regulation arrays R1 to R4 require different regulation voltages, and thus the regulation arrays R1 to R4 are pre-charged to different target values (regulation voltages) in the blanking period. The following description will discuss in detail about the pre-charging operations of the regulation arrays R1 to R4 in the blanking period.

In one embodiment, the blanking period is divided into a plurality of sub-periods, for example, a first sub-period T1 and a second sub-period T2 following the first sub-period T1 (that is, the second sub-period T2 is after the first sub-period T1). In the first sub-period T1 of the blanking period, the scan driver 30 sends a first scan signal SCAN1 to the first regulation array R1 through the first scan lines G1-1 and G1-2 of the first scan line group Group1, in order to turn on the pixels 121a to 121d in the first regulation array R1. The data driver 40 sends a first data signal to the first regulation array R1 through the data lines D1 and D2, which is required by the first regulation array R1 for displaying the second image (or the first image). In this way, the pixels 121a to 121d in the first regulation array R1 are pre-charged in the first sub-period T1. In one embodiment, the first data signal is defined to be a regulation voltage required by the pixels 121a to 121d in the first regulation array R1 in the first sub-period T1 of the blanking period, but it is not limited thereto. In one embodiment, the first data signal (for example, the regulation voltage in the first regulation array R1) is generated by the timing controller 20 and then sent to the data driver 40, but it is not limited thereto.

Because, in this embodiment, the pixels (for example, pixels 121a and 121c, or pixels 121b and 121d) in the first regulation array R1 and the pixels (for example, pixels 123a and 123c, or pixels 123b and 123d) of the third regulation array R3 correspond to the same first scan line (for example, G1-1 or G1-2), in one embodiment, the scan driver 30 can also send the first scan signal SCAN1 to the third regulation array R3 through the first scan line group Group1 in the first sub-period T1, so as to turn on the switch components 130 of the pixels (pixels 123a to 123d) in the third regulation array R3. The data driver 40 sends a third data signal of the second image (or the first image) required by the third regulation array R3 to the third regulation array R3 through the data lines D3 and D4. In this way, the third regulation array R3 is pre-charged. In one embodiment, the third data signal is defined to be the regulation voltage required by the pixels 123a to 123d in the third regulation array R3 in the first sub-period T1 of the blanking period, but it is not limited thereto. In one embodiment, the third data signal (for example, the regulation voltage of the third regulation array R3) is generated by the timing controller 20 and then sent to the data driver 40, but it is not limited thereto.

In a second sub-period T2 of the blanking period, the scan driver 30 sends the second scan signal SCAN2 to the second regulation array R2 through the second scan lines G2-1 and G2-2, so as to turn on the switch components 130 of the pixels (pixels 122a to 122d) in the second regulation array R2. The data driver 40 sends a second data signal of the second image (or the first image) required by the second regulation array R2 to the second regulation array R2 through the data lines D1 and D2, In this way, the second regulation array R2 is pre-charged. In one embodiment, the second data signal is defined to be the regulation voltage required by the pixels 122a to 122d in the second regulation array R2 in the second sub-period T2 of the blanking period, but it is not limited thereto. In one embodiment, in the case of the first regulation array R1 and the second regulation array R2 requiring different regulation voltages, the first sub-period T1 does not overlap the second sub-period T2. In one embodiment, the second data signal (for example, the regulation voltage of the second regulation array R2) is generated by the timing controller 20 and then sent to the data driver 40, but it is not limited thereto.

Because the pixels (for example, pixels 122a and 122c, or pixels 122b and 122d) in the second regulation array R2 and the pixels (for example, pixels 124a and 124c, or pixels 124b and 124d) in the fourth regulation array R4 correspond to the same scan line (for example, G2-1 or G2-2), in one embodiment, the scan driver 30 can also send the second scan signal SCAN2 to the fourth regulation array R4 through second scan line group Group2 in the second sub-period T2, so as to turn on the switch components 130 of the pixels 124a to 124d in the fourth regulation array R4. The data driver 40 sends a fourth data signal to the fourth regulation array R4 through the data lines D3 and D4, which is required by the fourth regulation array R4 for displaying the second image (or the first image). In this way, the fourth regulation array R4 is pre-charged. In one embodiment, the fourth data signal is defined to be the regulation voltage required by the pixels 124a to 124d in the fourth regulation array R4 in the second sub-period T2 of the blanking period, but it is not limited thereto. Furthermore, in another embodiment, the pre-charging periods of the second scan lines G2-1 and G2-2 may be different in timing for the second regulation array R2 and the fourth regulation array R4. In one embodiment, the fourth data signal (for example, the regulation voltage of the fourth regulation array R4) is generated by the timing controller 20 and sent to the data driver 40, but it is not limited thereto.

In this way, the regulation arrays R1 to R4 can be pre-charged to the required regulation voltage in the first sub-period T1 or the second sub-period T2 of the blanking period, in order to shorten the charging period of the pixels for displaying the second image subsequently. It is also possible to pre-charge the regulation arrays R1 to R4 to different regulation voltages respectively according to their requirements, in order to improve the charging efficiency.

In addition, in one embodiment, the timing controller 20 can generate the data signals (for example, the regulation voltages) for the regulation arrays (R1 to R4), respectively, but it is not limited thereto. The following description will discuss about how the timing controller 20 generates the data signals (for example, the regulation voltages) for the regulation arrays (R1 to R4), referring again to both FIGS. 1 and 2.

In one embodiment, the timing controller 20 uses a calculation unit 22, to calculate the data signals (for example, the regulation voltages) required by the pixels 121a to 121d in the first regulation array R1, the pixels 122a to 122d in the second regulation array R2, the pixels 123a to 123d in the third regulation array R3 and the pixels 124a to 124d in the fourth regulation array R4 in the first sub-period T1 or the second sub-period T2. In one embodiment, the calculation unit 22 is configured to perform calculation in the blanking period, but it is not limited thereto. In another embodiment, the calculation unit 22 is configured to perform calculation in the first update period.

In one embodiment, an algorithm is written into the chip of the timing controller 20, so that the timing controller 20 has the function of the aforementioned calculation unit 22. In another embodiment, the calculation unit 22 is a component out of the timing controller 20, for example, an external processor, a circuit structure, a cloud server, and so on, which sends the calculated result to the timing controller 20.

In practical applications, the calculation unit 22 of the present disclosure may be implemented in various ways, without being limited to the aforementioned examples. Furthermore, in one embodiment, the timing controller 20 has a storage region (for example, memory) to store the data required for displaying the first image or the second image (for example, the required gray level voltages), but it is not limited thereto. By setting the calculation unit 22, the data signal (for example, the regulation voltage) may have various implementations, which will be discussed in the following description with some embodiments. In these cases, the data signals simply refer to the gray level voltages, but it is not limited thereto.

Figure 3A:
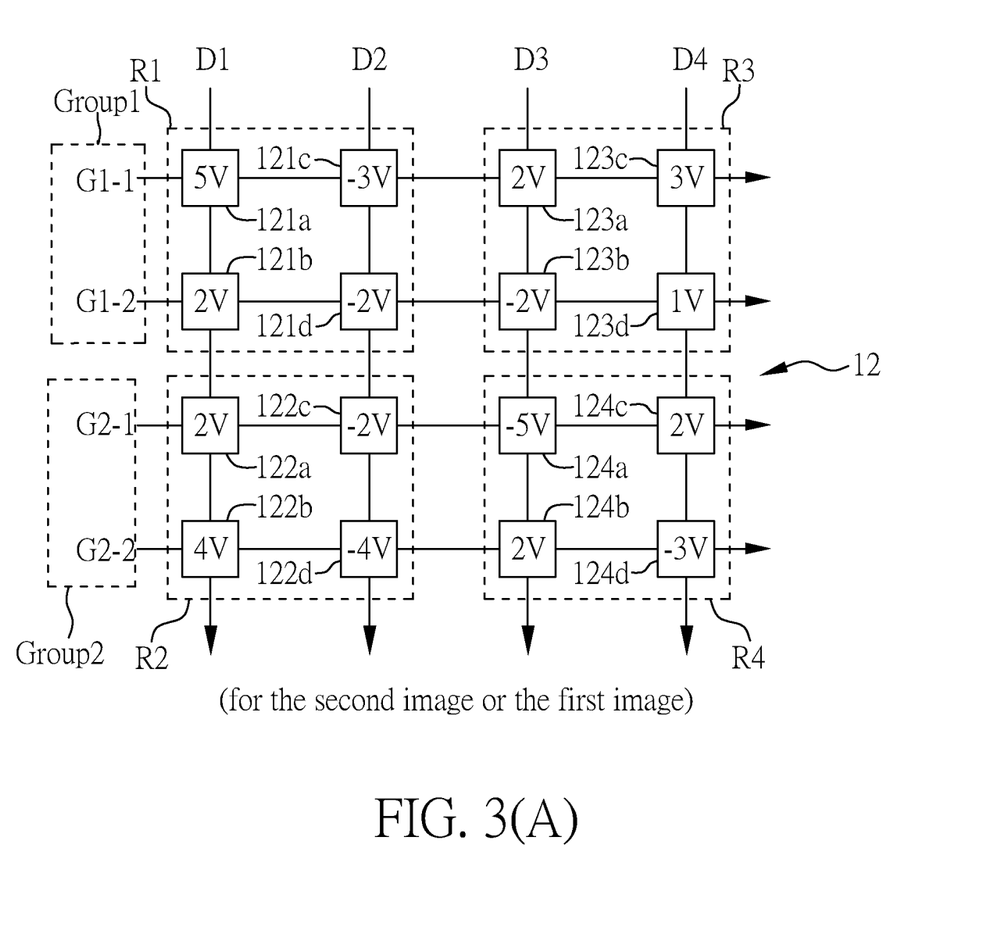
FIG. 3(A) is a schematic diagram illustrating the gray level voltage distribution when the display array displays the second image (or the first image) according to one embodiment of the present disclosure.

FIG. 3(A) is a schematic diagram illustrating the gray level voltage distribution when the display array 12 displays the second image (or the first image) according to one embodiment of the present disclosure, with which the case of FIG. 2 is taken as an example for illustration by referring to both FIGS. 1 and 2. As shown in FIG. 3(A), for displaying the second image (or the first image), the pixels 121a, 121b, 121c and 121d in the first regulation array R1 require gray level voltages of 5V, 2V, −3V and −2V, respectively. The pixels 122a, 122b, 122c and 122d in the second regulation array R2 require gray level voltages of 2V, 4V, −2V and −4V, respectively. The pixels 123a, 123b, 123c and 123d of the third regulation array R3 require gray level voltages of 2V, −2V, 3V and 1V, respectively. The pixels 124a, 124b, 124c and 124d of the fourth regulation array R4 require gray level voltages of −5V, 2V, 2V, −3V, respectively, but it is not limited thereto in the present disclosure.

Figure 3B:
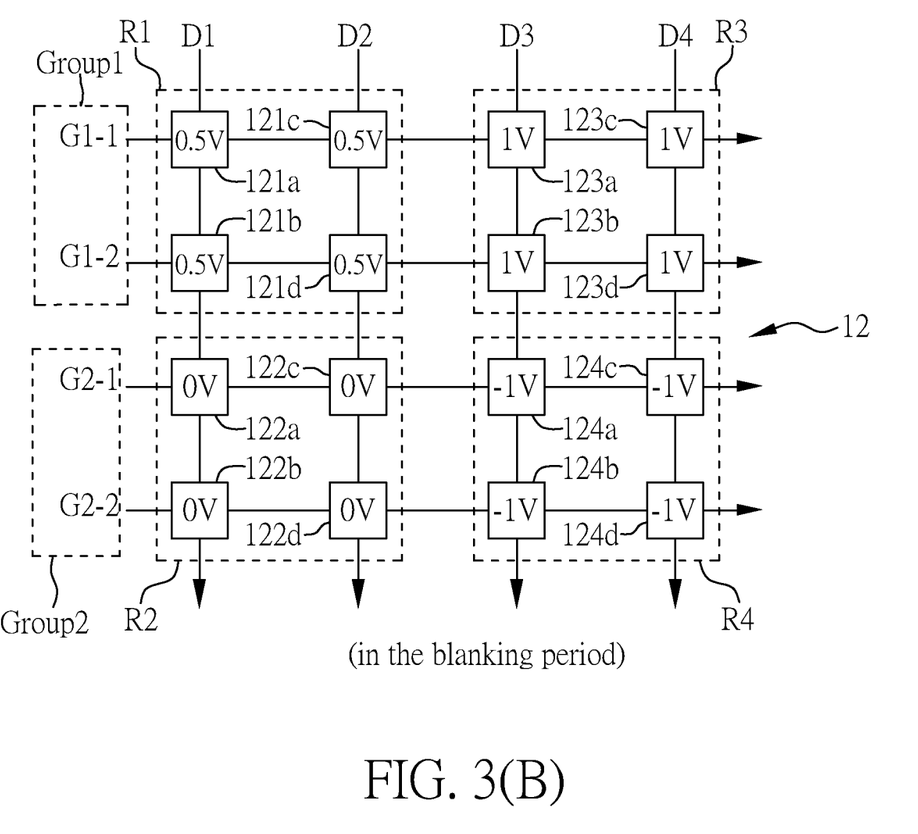
FIG. 3(B) is a schematic diagram illustrating distribution of the pre-charged regulation voltage of the display array in the blanking period according to one embodiment of the present disclosure.

FIG. 3(B) is a schematic diagram illustrating the distribution of pre-charge of the display array 12 in the blanking period according to one embodiment of the present disclosure, which corresponds to FIG. 3(A). In this embodiment, the regulation voltage is defined to be the average value of the gray level voltages required by all the pixels in the regulation array in the first sub-period T1 or the second sub-period T2. For example, the calculation unit 22 calculates, for the gray level voltages (for example, 5V, 2V, −3V, −2V) required by all the pixels 121a to 121d in the first regulation array R1 for displaying the second image (or the first image), the average value (for example, 0.5V). This average value is the regulation voltage required by the pixels 121a to 121d in the first regulation array R1 within the first sub-period T1 of the blanking period. Then, the timing controller 20 sends the clock pulse and the regulation voltage (for example, 0.5V) to the data driver 20, allowing the data driver 20 to send this regulation voltage to the first regulation array R1 in the blanking period. In this way, in this embodiment, all the pixels 121a to 121d in the first regulation array R1 will be pre-charged to 0.5V in the blanking period, all the pixels 122a to 122d in the second regulation array R2 will be pre-charged to 0V in the blanking period, all the pixels 123a to 123d in the third regulation array R3 will be pre-charged to 1V in the blanking period, and all the pixels 124a to 124d in the fourth regulation array R4 will be pre-charged to −1V in the blanking period. The aforementioned description is only exemplary, and not meant to be limiting.

Figure 3C:
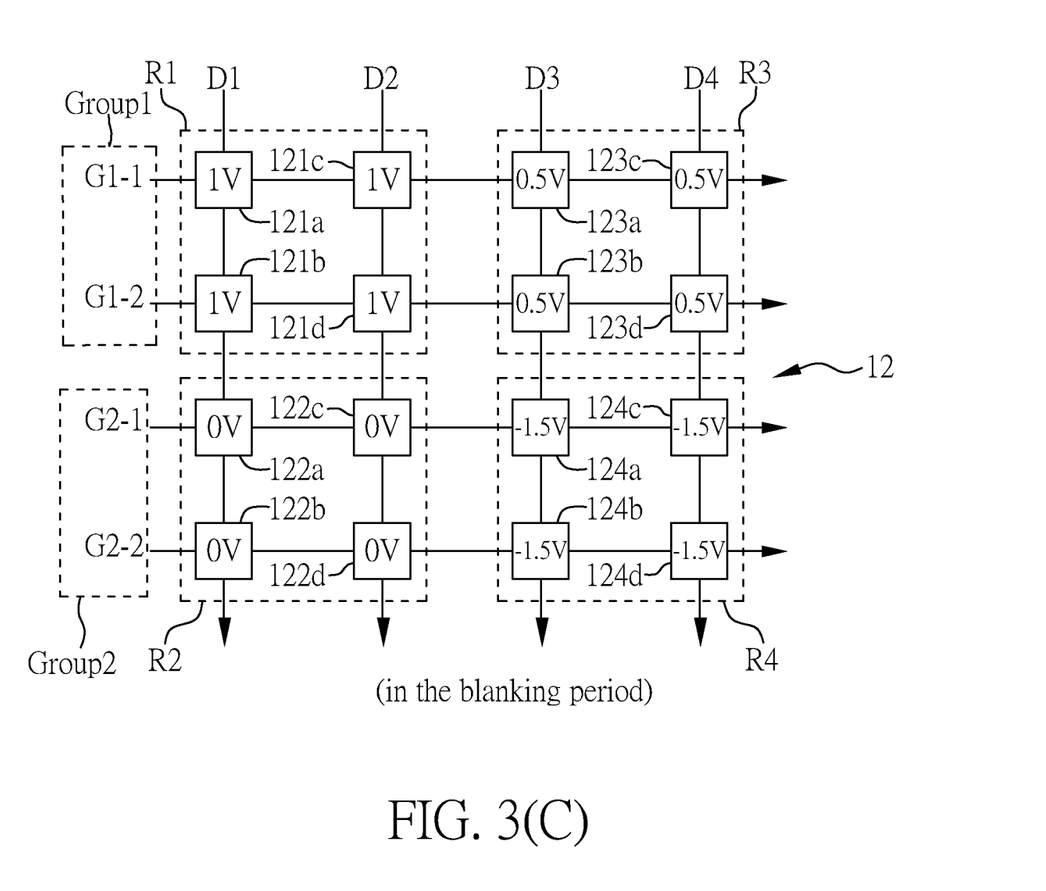
FIG. 3(C) is a schematic diagram illustrating distribution of the pre-charged regulation voltage of the display array in the blanking period according to another embodiment of the present disclosure.

FIG. 3(C) is a schematic diagram illustrating the distribution of pre-charge of the display array 12 in the blanking period according to another embodiment of the present disclosure, which corresponds to FIG. 3(A). In this embodiment, the regulation voltage is defined to be the average value of the maximum value and the minimum value of the gray level voltages (that is, the regulation voltage=0.5* (maximum value of the gray level voltages+the minimum value of the gray level voltage)) required by the pixels in the regulation array for displaying the second image (or the first image). For example, the calculation unit 22 calculates, for the gray level voltages (for example, 5V, 2V, −3V, −2V) required by all the pixels 121a to 121d in the first regulation array R1 for displaying the second image (or the first image), the average value (for example, 1V) of the maximum value (for example, 5V) and the minimum value (for example, −3V). This average value is the regulation voltage required by the pixels 121a to 121d in the first regulation array R1 in the first sub-period T1 of the blanking period. Then, the timing controller 20 sends the clock pulse and the regulation voltage (for example, 1V) to the data driver 20, allowing the data driver 20 to send this regulation voltage to the first regulation array R1 in the blanking period. In this way, in this embodiment, all the pixels 121a to 121d in the first regulation array R1 will be pre-charged to 1V in the blanking period, all the pixels 122a to 122d in the second regulation array R2 will be pre-charged to 0V in the blanking period, all the pixels 123a to 123d in the third regulation array R3 will be pre-charged to 0.5V in the blanking period, and all the pixels 124a to 124d in the fourth regulation array R4 will be pre-charged to −1.5V in the blanking period. The aforementioned description is only exemplary, and not meant to be limiting.

With the timing control of the timing controller 20, the operation of the scan driver 30 in the blanking period may also have various implementations, which will be discussed in the following description with some embodiments, but it is not limited thereto.

Figure 4A:
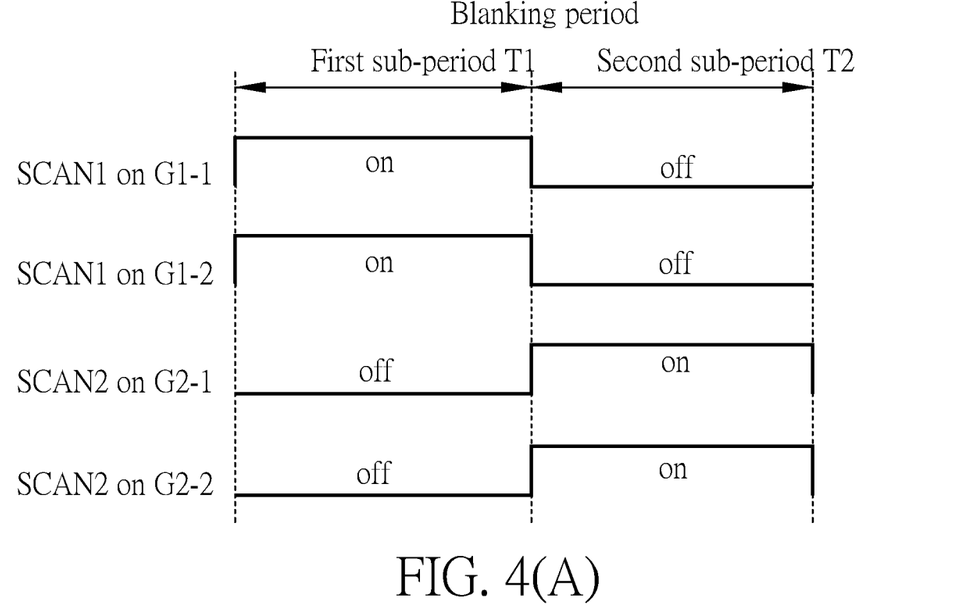
FIG. 4(A) is a timing diagram of the scan signal in the blanking period according to one embodiment of the present disclosure.

FIG. 4(A) is a timing diagram of the scan signal in the blanking period according to one embodiment of the present disclosure, which corresponds to the case of FIG. 2. For the sake of explanation, also referring to FIGS. 1 to 3(C), the following example is given that the first regulation array R1 and the third regulation array R3 are pre-charged simultaneously, and the second regulation array R2 and the fourth regulation array R4 are pre-charged simultaneously (but it is not limited thereto). As shown in FIG. 4(A), in the first sub-period T1 of the blanking period, the scan driver 30 is controlled by the timing controller 20 (for example, with the timing control signal) to enable the first scan line group Group1 (the first scan lines G1-1 and G1-2) to synchronously send the first scan signal SCAN1 to the first regulation array R1 and the third regulation array R3, thereby turning on the switch components 130 to pre-charge the pixels 121a to 121d in the first regulation array R1 and the pixels 123a to 123d in the third regulation array R3. In the second sub-period T2 following the first sub-period T1, the scan driver 30 is controlled by the timing controller 20 (for example, with the timing control signal) to enable the second scan line group Group2 (the second scan lines G2-1 and G2-2) to synchronously send the second scan signal SCAN2 to the second regulation array R2 and the fourth regulation array R4, thereby turning on the switch components 130 to pre-charge the pixels 122a to 122d in the second regulation array R2 and the pixels 124a to 124d in the fourth regulation array R4. In this embodiment, the first sub-period T1 does not overlap the second sub-period T2 in timing. In another embodiment, the first sub-period T1 at least partially overlaps the second sub-period T2, but it is not limited thereto. In this embodiment, the first scan signal SCAN1 and the second scan signal SCAN2 have the same duty ratio; that is, the period that the first scan signal SCAN1 appears HIGH and the period that the second scan signal SCAN2 appears HIGH have the same temporal length in the blanking period, but it is not limited thereto.

Figure 4B:
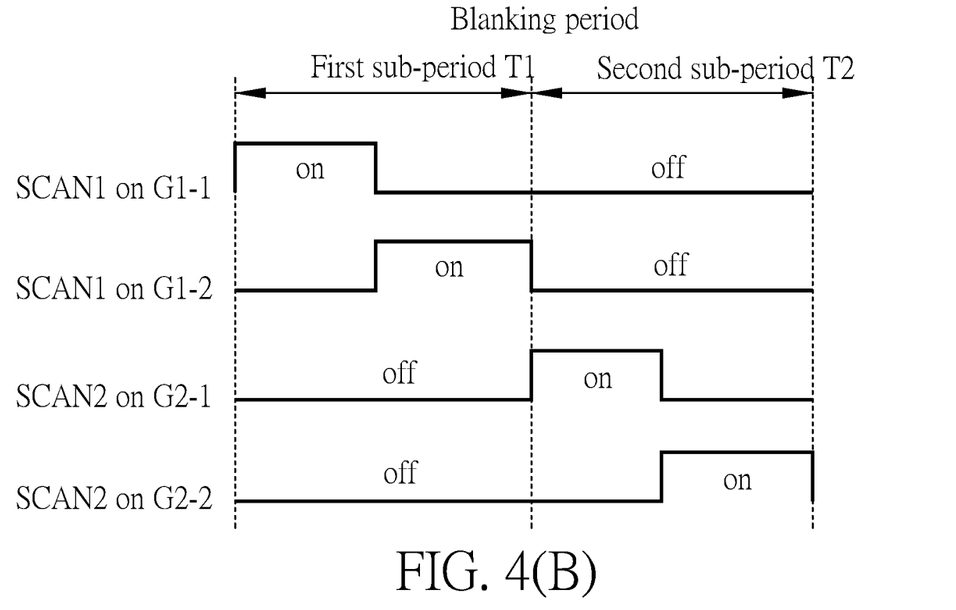
FIG. 4(B) is a timing diagram of the scan signal in the blanking period according to another embodiment of the present disclosure.

FIG. 4(B) is a timing diagram of scan signal in the blanking period according to another embodiment of the present disclosure, which corresponds to the case of FIG. 2. For the sake of explanation, also referring to FIGS. 1 to 3(C), the following example is given that the first regulation array R1 and the third regulation array R3 are pre-charged simultaneously, and the second regulation array R2 and the fourth regulation array R4 are pre-charged simultaneously (but it is not limited thereto). As shown in FIG. 4(B), in the first sub-period T1 of the blanking period, the scan driver 30 is controlled by the timing controller 20 (for example, with the timing control signal) to asynchronously enable the first scan line group Group1 (the first scan lines G1-1 and G1-2) to send the first scan signal scan1 to the first regulation array R1 and the third regulation array R3; that is, the pixels 121a and 121c in the first regulation array R1 and the pixels 123a and 123c in the third regulation array R3 are turned on and pre-charged at first, and then the pixels 121b and 121d in the first regulation array R1 and the pixels 123b and 123d in the third regulation array R3 are turned on and pre-charged. In the second sub-period T2 following the first sub-period T1, the scan driver 30 is controlled by the timing controller 20 (for example, with the timing control signal) to asynchronously enable the second scan line group Group2 (the second scan lines G2-1 and G2-2) to send the second scan signal scan2 to the second regulation array R2 and the fourth regulation array R4; that is, the pixels 122a and 122c in the second regulation array R2 and the pixels 124a and 124c in the fourth regulation array R4 are turned on and pre-charged at first, and then the pixels 122b and 122d in the second regulation array R2 and the pixels 124b and 124d in the fourth regulation array R4 are turned on and pre-charged. In this embodiment, the first sub-period T1 does not overlap the second sub-period T2. In another embodiment, the first sub-period T1 at least partially overlaps the second sub-period T2, but it is not limited thereto. In this embodiment, the first scan signal scan1 and the second scan signal scan2 have the same duty ratio, but it is not limited thereto. In another embodiment, the first scan signal SCAN1 and the second scan signal SCAN2 have different duty ratios. Furthermore, the first scan lines G1-1 and G1-2 may send the first scan signal SCAN1 in various orders; for example, the first scan line G1-2 sends the first scan signal SCAN1 at first, and then the first scan line G1-1 sends the first scan signal SCAN1 (that is, the period that the first scan signal SCAN1 is HIGH in the first scan line G1-2 is earlier than the period that the first scan signal SCAN1 is HIGH in the first scan line G1-1). Similarly, the second scan line G2-1 and the second scan line G2-2 may send the second scan signal SCAN2 in various order, and it is not limited thereto in the present disclosure. In other words, the scan lines in the first scan line group Group1 may perform scanning in any order, and the scan lines in the second scan line group Group2 may also perform scanning in any order.

Figure 4C:
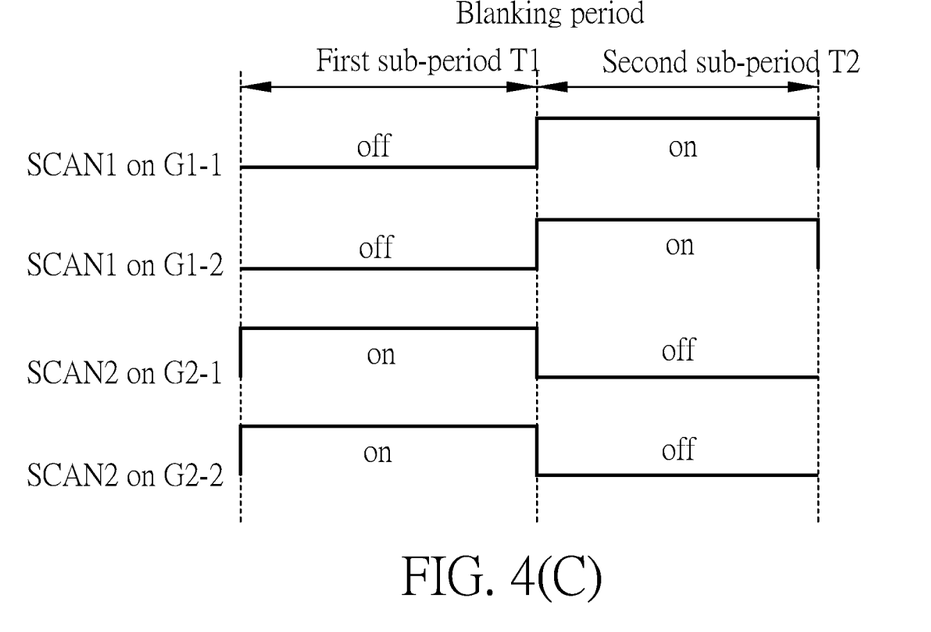
FIG. 4(C) is a timing diagram of the scan signal in the blanking period according to still another embodiment of the present disclosure.

FIG. 4(C) is a timing diagram of the scan signal in the blanking period according to still another embodiment of the present disclosure, which corresponds to the case of FIG. 2. For the sake of explanation, also referring to FIGS. 1 to 3(C), the following example is given that the first regulation array R1 and the third regulation array R3 are pre-charged simultaneously, and the second regulation array R2 and the fourth regulation array R4 are pre-charged simultaneously (but it is not limited thereto). As shown in FIG. 4(C), in the first sub-period T1 of the blanking period, the scan driver 30 is controlled by the timing controller 20 (for example, with the timing control signal) to enable the second scan line group Group2 (the second scan lines G2-1 and G2-2) to synchronously send the second scan signal SCAN2 to the second regulation array R2 and the fourth regulation array R4, so as to turn on and pre-charge the pixels 122a to 122d in the second regulation array R2 and the pixels 124a to 124d in the fourth regulation array R4. In the second sub-period T2 following the first sub-period T1, the scan driver 30 is controlled by the timing controller 20 (for example, with the timing control signal) to enable the first scan line group Group1 (the first scan lines G1-1 and G1-2) to send the first scan signal SCAN1 to the first regulation array R1 and the third regulation array R3, so as to turn on and pre-charge the pixels 121a to 121d in the first regulation array R1 and the pixels 123a to 123d in the third regulation array R3. In this embodiment, the first sub-period T1 does not overlap the second sub-period T2 in timing. In another embodiment, the first sub-period T1 at least partially overlaps the second sub-period T2, but it is not limited thereto. In this embodiment, the first scan signal SCAN1 and the second scan signal SCAN2 have the same duty ratio, but it is not limited thereto. Furthermore, the first scan lines G1-1 and G1-2 may also asynchronously send the first scan signal SCAN1, and the second scan lines G2-1 and G2-2 may also asynchronously send the second scan signal SCAN2, but it is not limited thereto in the present disclosure.

Figure 4D:
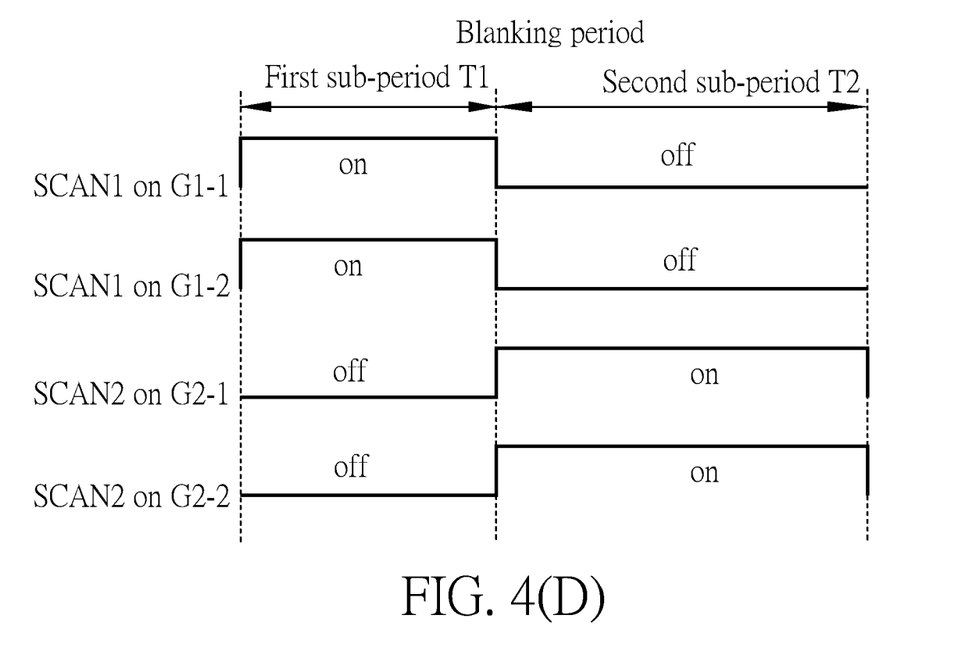
FIG. 4(D) is a timing diagram of the scan signal in the blanking period according to yet another embodiment of the present disclosure.

FIG. 4(D) is a timing diagram of the scan signal in the blanking period according to still another embodiment of the present disclosure, which corresponds to the case of FIG. 2. For the sake of explanation, also referring to FIGS. 1 to 3(C), the following example is given that the first regulation array R1 and the third regulation array R3 are pre-charged simultaneously, and the second regulation array R2 and the fourth regulation array R4 are pre-charged simultaneously (but it is not limited thereto). This embodiment is similar to the case of FIG. 4(A); for example, in the first sub-period T1 of the blanking period, the scan driver 30 is controlled by the timing controller 20 (for example, with the timing control signal) to enable the first scan line group (the first scan lines G1-1 and G1-2) to synchronously send the first scan signal SCAN1 to the first regulation array R1 and the third regulation array R3. The difference between this embodiment and the embodiment of FIG. 4(A) is that, in this embodiment, the first scan signal SCAN1 and the second scan signal SCAN2 have different duty ratios; that is, the period that the first scan signal SCAN1 appears HIGH and the period that the second scan signal SCAN2 appears HIGH have different temporal lengths. Furthermore, in this embodiment, the first sub-period T1 does not overlap the second sub-period T2 in timing. In another embodiment, the first sub-period T1 at least partially overlaps the second sub-period T2, but it is not limited thereto.

The embodiments of FIG. 4(A) to 4(D) are exemplary and not meant to be limiting. The features in the aforementioned embodiments may be combined or modified with each other as long as possible (for example, the number of regulation arrays, the order for pre-charging a regulation region, the number of scan lines in a regulation array, the scanning order of scan lines in a regulation array, the period length for pre-charging a regulation array), but it is not limited thereto in the present disclosure.

Figure 5:
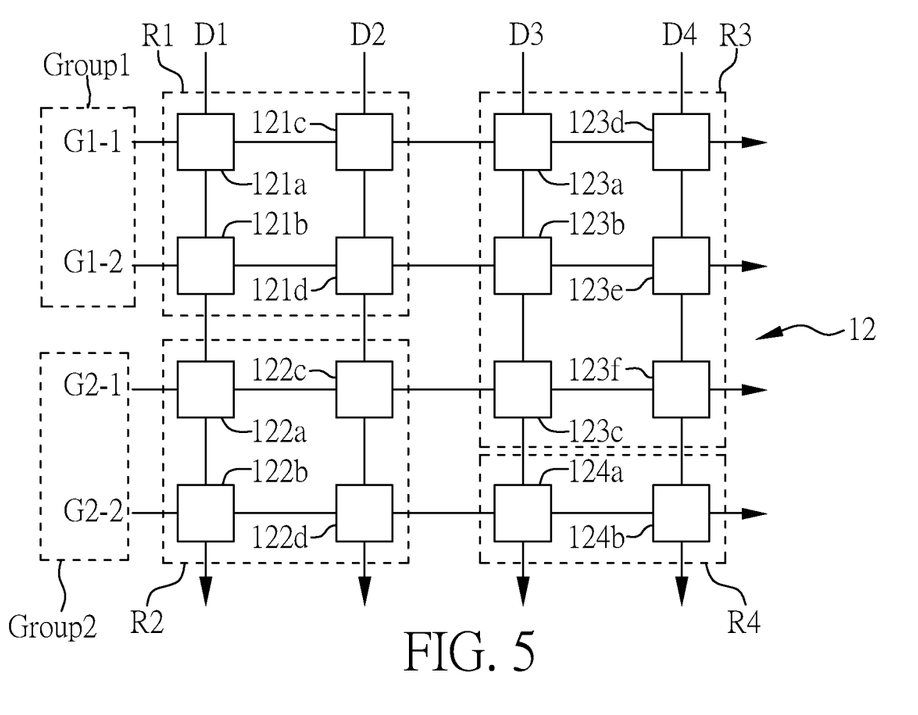
FIG. 5 is schematic diagram illustrating the structure of the display array according to another embodiment of the present disclosure.

FIG. 5 is a schematic diagram illustrating the structure of the display array 12 according to another embodiment of the present disclosure. For the sake of explanation, the display array 12 is simplified, also referring to FIGS. 1 to 4(D). The embodiment of FIG. 5 is structurally similar to the embodiment of FIG. 2, and thus the following explanation is made for their difference. The difference between this embodiment and the embodiment of FIG. 2 is that, different regulation arrays have different numbers of pixels in the vertical direction (along the direction of the data line); for example, the first regulation array R1 and the second regulation array R2 have the same number of pixels, and the first regulation array R1 and the third regulation array R3 or the fourth regulation array R4 have different numbers of pixels, but it is not limited thereto. In another embodiment, different regulation arrays have different numbers of pixels in the horizontal direction (along the direction of the scan line); for example, the first regulation array R1 and the second regulation array R2 have the same number of pixels, and the third regulation array R3 and the fourth regulation array R4 have the same number of pixels, while the first regulation array R1 and the third regulation array R3 have different numbers of pixels, but it is not limited thereto.

In the embodiment of FIG. 5, the first scan line group Group1 is arranged corresponding to one portion of the third regulation array R3, and one portion of the second scan line group Group2 is arranged corresponding to another portion of the third regulation array R3; for example, the first scan line group Group1 and the scan line G2-1 in the second scan line group Group2 are respectively electrically connected with the gate ends of the switch components 130 of the pixels in different rows of the third regulation array R3 (for example, the first scan line group Group1 corresponds to the pixels 123a and 123d, the pixels 123b and 123e, and the scan line G2-1 in the second scan line group Group2 corresponds to the pixels 123c and 123f). Furthermore, one portion of the second scan line group Group2 is arranged corresponding to the fourth regulation array R4; for example, the scan line G2-2 in the second scan line group Group2 is electrically connected with the gate ends of the switch components 130 of the pixels in row of the fourth regulation array R4 (for example, the pixels 124a and 124b).

In this embodiment, in the blanking period, the regulation arrays R1 to R4 are pre-charged to their respective regulation voltages in the second update period (or the first update period). The definition of the regulation voltage is explained previously in the cases of FIGS. 3(A) to 3(C), and thus the explanation is omitted here. The timings of the scan signals for the first regulation array R1 and the second regulation array R2 may be implemented by referring to the aforementioned embodiment(s), so that the following explanation is made for those of the third regulation array R3 and the fourth regulation array R4.

In one embodiment, the whole third regulation array R3 is pre-charged in different sub-periods of the blanking period; for example, one portion of the third regulation array R3 is pre-charged during the first regulation array R1 being pre-charged (for example, during the first scan line G1-1 sending the first scan signal SCAN1 and the first scan line G1-2 sending the first scan signal SCAN1), and then, another portion of the third regulation array R3 is pre-charged in one period section during the second regulation array R2 being pre-charged (for example, the period that the second scan line G2-1 sends the second scan signal SCAN2), but it is not limited thereto. The fourth regulation array R4 is pre-charged in another period section during the second regulation array R2 being pre-charged (for example, the period that the second scan line G2-2 sends the second scan signal SCAN2), but it is not limited thereto. In another embodiment, the number of scan lines in the first scan line group Group1 and the second scan line group Group2 for sending scan signal at the same time is determined based on the greatest common divisor of the number of scan lines for the first regulation array R1, the number of scan lines for the second regulation array R2, the number of scan lines for the third regulation array R3, and the number of scan lines for the fourth regulation array R4. Referring to FIG. 5 for example, the first regulation array R1 and the second regulation array R2 use two scan lines, the first regulation array R3 uses three scan lines, and the fourth regulation array R4 uses one scan line. Thus, the first scan line group Group1 and the second scan line group Group2 should use one scan line for pre-charging at the same time. In another embodiment, the regulation arrays R1 to R4 have their respective pre-charging periods in the blanking period; that is, the regulation arrays R1 to R4 have non-overlapped pre-charging periods, but it is not limited thereto.

Furthermore, the features in the embodiments of FIGS. 4(A) to 4(D) may also be applied to this case. For example, it is possible to exchange the order of the pre-charging period of the first regulation array R1 and the pre-charging period of the second regulation array R2. The first scan signal SCAN1 and the second scan signal SCAN2 may have different duty ratios, and so on, and it is not limited thereto in the present disclosure.

Figure 6:
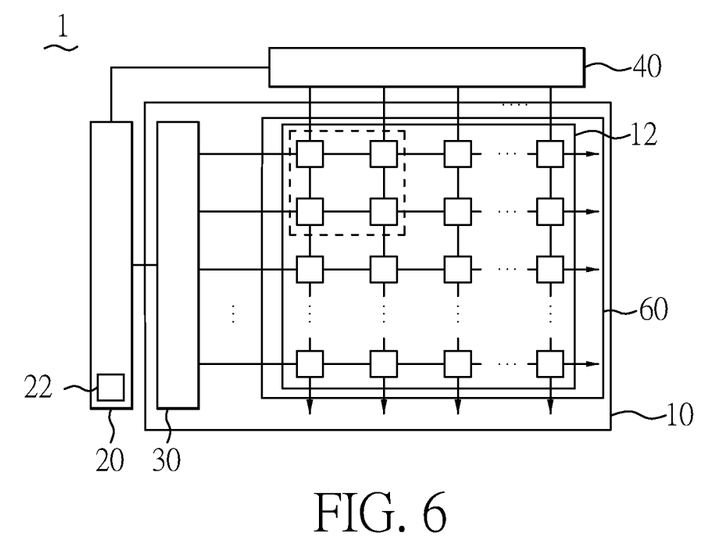
FIG. 6 is schematic diagram illustrating the structure of the display device according to another embodiment of the present disclosure.

In addition, in the present disclosure, the sizes or configurations (for example, the numbers of pixels or the shapes) of the regulation arrays R1 to R4 are only exemplary, but in practical applications, more different configurations may be possible. For example, a regulation array is rectangular or square, but it is not limited thereto. Moreover, the display region of the panel may be rectangular, square, round, polygonal and of any shape, but it is not limited thereto. If the panel 10 of the present disclosure is a liquid crystal display panel, the display device 1 may have a backlight module 60, as shown in FIG. 6. FIG. 6 is a schematic diagram illustrating the structure of the display device 1 according to another embodiment of the present disclosure. Referring to FIGS. 1 to 5 as well, the embodiment of FIG. 6 is similar to the embodiment of FIG. 1, in which the switch components 130 of the pixels of the display array 12 are thin film transistors, but it further comprises a backlight module 60 arranged on the back surface of the panel 10 with respect to its display surface (that is, the opposite surface of its display surface) for providing backlights to the panel 10. In one embodiment, the backlight module 60 is turned off (i.e. in off-state) in the blanking period for power saving, but it is not limited thereto. In another embodiment, the backlight module 60 remains turned on (i.e. in on-state) in the blanking period, but it is not limited thereto. In still another embodiment, the backlight module 60 remains turned on (i.e. in on-state) in one section of the blanking period, while turned off in another section of the blanking period. In still another embodiment, the backlight module 60 remains turned off (i.e. in off-state) in one section of the blanking period, while turned on in another section of the blanking period, but it is not limited thereto.

In the present disclosure, the display device 1 may be an LCD, an OLED, a micro LED, a Q-LED, a flexible display, and so on, but it is not limited thereto. Moreover, the display device 1 provided in the aforementioned embodiments may be combined with a touch panel to become a touch display device (e.g. in-cell touch, out-cell touch, on-cell touch, hybrid touch). For example, the display devices 1 is assembled with a touch panel (not shown), known as "out-cell touch", or the touch panel is integrated into the display array 12 of the display panel 10 known as "in-cell touch". Furthermore, the display device or the touch display device provided in the aforementioned embodiments of the present disclosure may be used in various kinds of electronic devices in the art that require display screens to display images, such as displays, cellphones, notebook computers, video cameras, photo cameras, music players, mobile navigators, televisions, instrument panels, central consoles, electronic rear mirrors, head-up displays, and so on.

In this way, the display device 1 of the present disclosure can be pre-charged in the blanking period, and the different regulation arrays of the display array 12 can be pre-charged to different regulation voltages respectively according to their requirements for displaying images, in order to significantly improve the charging efficiency.

The aforementioned embodiments are only examples for the sake of explanation, the scope of the present disclosure is accorded to the claims defined hereinafter, and not limited to the aforementioned embodiments.

What is claimed is:

1. A display device, comprising:
a panel, the panel comprising:
a display array for displaying a first image and a second image following the first image, the display array having a first regulation array; and
a first scan line group arranged corresponding to the first regulation array;
wherein a blanking period exists between a first update period corresponding to the first image and a second update period corresponding to the second image, the blanking period has a first sub-period, and the first scan line group sends a first scan signal to the first regulation array in the first sub-period;
wherein the display array further comprises a second regulation array, the panel further comprises a second scan line group arranged corresponding to the second regulation array, the blanking period further comprises a second sub-period, the second scan line group sends a second scan signal to the second regulation array in the second sub-period, and the first sub-period does not overlap the second sub-period.

2. The display device as claimed in claim 1, wherein the first scan signal and the second scan signal have different duty ratios.

3. The display device as claimed in claim 1, wherein the first regulation array comprises a plurality of first pixels, the second regulation array comprises a plurality of second pixels, and a number of the first pixels is different from a number of the second pixels.

4. The display device as claimed in claim 3, wherein at least one pixel of the first pixels has a switch component.

5. The display device as claimed in claim 1, wherein a shape of the panel is different from a shape of the first regulation array.

6. The display device as claimed in claim 1, wherein the panel further comprises a plurality of data lines arranged corresponding to the first regulation array for sending a regulation voltage to the first regulation array in the blanking period.

7. The display device as claimed in claim 6, wherein the first regulation array further comprises a plurality of first pixels, and the regulation voltage is an average value of gray level voltages of the first pixels when displaying the first image or the second image.

8. The display device as claimed in claim 6, wherein the first regulation array further comprises a plurality of first pixels, and the regulation voltage is an average value of a maximum gray level voltage and a minimum gray level voltage of the first pixels when displaying the first image or the second image.

9. The display device as claimed in claim 1, wherein the first scan line group further comprises a plurality of first scan lines, and the first scan lines synchronously send the first scan signal to the first regulation array in the first sub-period.

10. The display device as claimed in claim 1, wherein the first scan line group further comprises a plurality of first scan lines, and the first scan lines asynchronously send the first scan signal to the first regulation array in the first sub-period.

11. The display device as claimed in claim 1, further comprising a backlight module.

12. The display device as claimed in claim 11, wherein the backlight module is in off-state in the blanking period.

13. The display device as claimed in claim 11, wherein the backlight module is in on-state in the blanking period.

14. The display device as claimed in claim 11, wherein the backlight module is in on-state in one section of the blanking period, while turned off in another section of the blanking period.

15. The display device as claimed in claim 1, wherein the panel further comprises a scan driver electrically connected with at least one of the first scan line group, a data driver electrically connected with at least one of a plurality of data lines arranged corresponding to the first regulation array, and a timing controller electrically connected with the scan driver and the data driver.

16. The display device as claimed in claim 15, further comprising a calculation unit for calculating a regulation voltage to pre-charge the first regulation array, wherein the calculation unit is implemented by writing an algorithm into a chip of the time controller or the calculation unit is a processor, a circuit structure or a cloud server.

17. The display device as claimed in claim 15, wherein the regulation voltage is an average value of gray level voltages.

18. The display device as claimed in claim 1, wherein the display device is a liquid crystal display, an organic light emitting diode display, a micro light emitting diode display, a quantum dot light emitting diode display, or a flexible display.

19. The display device as claimed in claim 1, wherein the display device is combined with a touch panel, or the touch panel is integrated into the display array of the panel.

* * * * *